Nov. 27, 1928.
R. H. WHITE
1,693,215
PROPELLING MEANS FOR CRAWLING TRACTORS
Filed Dec. 17, 1925
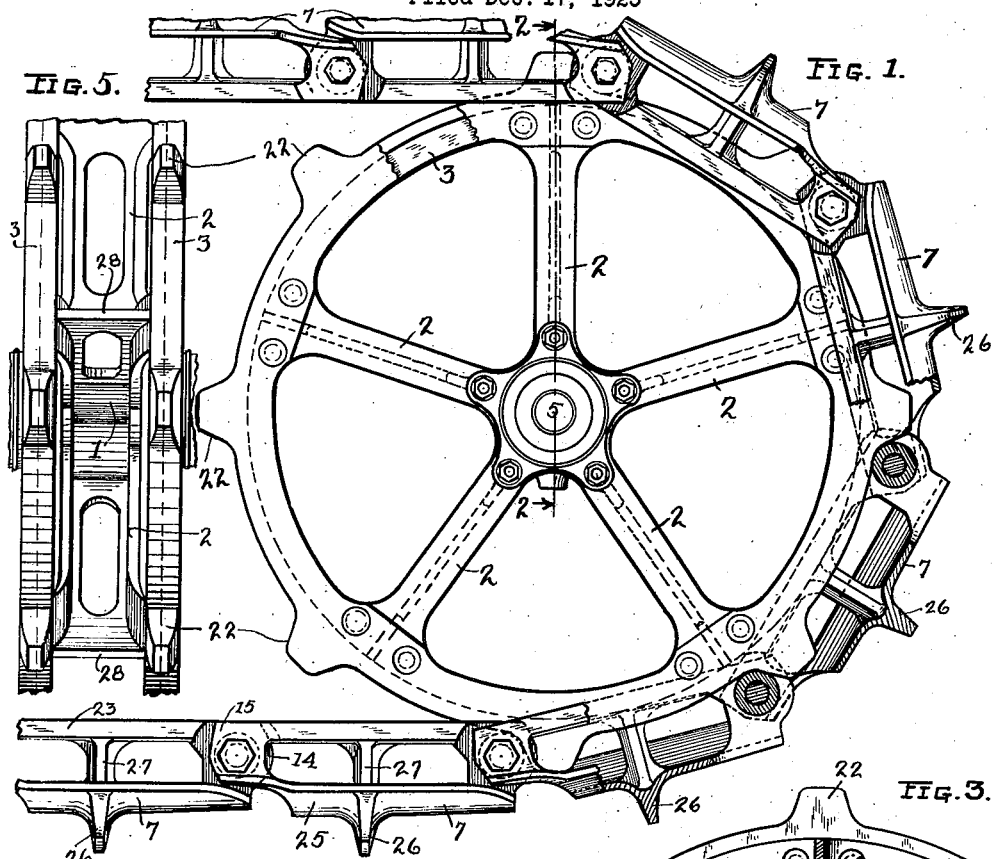
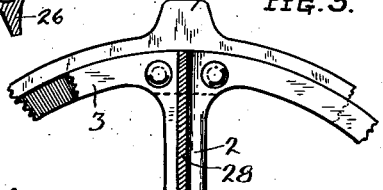
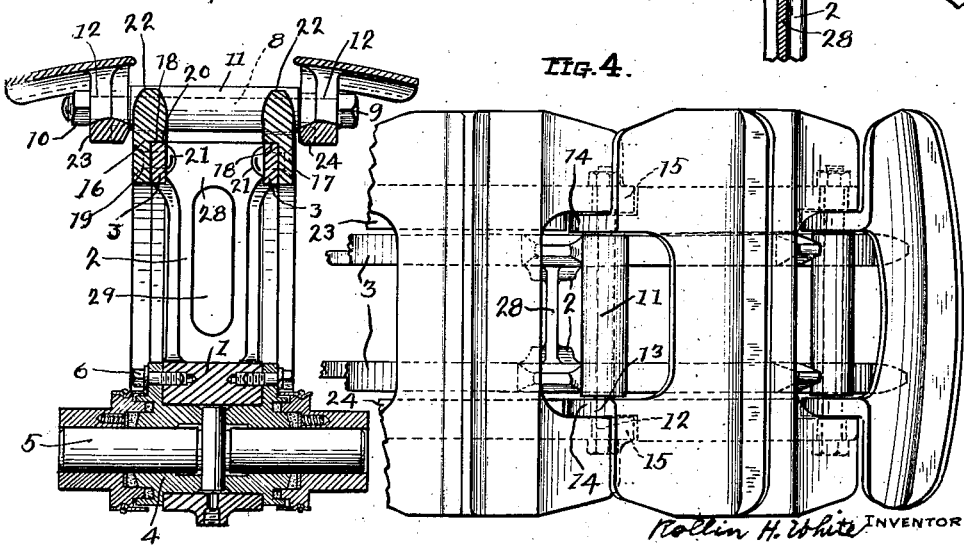
Rollin H. White INVENTOR
BY Frank L. Slough ATTORNEY Patented Nov. 27, 1928.

1,693,215

UNITED STATES PATENT OFFICE.

ROLLIN H. WHITE, OF CLEVELAND HEIGHTS, OHIO.

PROPELLING MEANS FOR CRAWLING TRACTORS.

Application filed December 17, 1925. Serial No. 75,955.

My invention relates to propelling means for crawling tractors and relates particularly to the provision of improved propelling means for crawling tractors of the type comprising a sprocket wheel, operating to propel the tractor, on an endless track.

Tractor mechanisms of this type are commonly operated over terrain comprising loose dirt, mud, gravel, and the like, and in which stones of varying size are encountered. Portions of the terrain comprising the stones of varying size are picked up by the endless track and conveyed thereby to wedging position between the driving and other sprockets embraced by the endless track of the tractor, with consequent tightening of the endless belt track against the sprocket wheels, decreasing very greatly the efficiency of the tractor as a mobile vehicle and oftentimes either breaking portions of the track, or the sprockets, or, as is yet more common, stalling the engine furnishing the motive power for the vehicle.

In constructions of track and sprockets which have been proposed, so far as I am aware, prior to my invention, although some efforts have been made to reduce the tendency for the endless track to pick up such foreign material and to prevent its being wedged between the track sections and the sprocket and to permit its ejection, such attempts have been at best only partially successful, for various reasons, among which are that in the effort to solve the problems presented, the efficiency and durability of the apparatus proposed has been caused to be much reduced and sometimes the cost of construction considerably increased.

An object of my invention, therefore, is to provide improved propelling means for crawling tractors, in which the collection and wedging of extraneous material and objects between the tractor belt and the sprockets will be very materially decreased.

Another object of my invention is to accomplish the efficient propulsion of the crawling tractor vehicle under various conditions of use and while traversing terrain, which may comprise gravel, mud and sand, and in which stones of varying sizes are encountered.

Another object of my invention is to provide mechanism for driving crawling tractors which will be very durable and the wearing parts of which will seldom require replacement.

Another object of my invention is to provide for the propelling means of crawling tractors, separable, replaceable wearing parts which may be attached and detached with a minimum of effort.

Another object of my invention is to accomplish the removal and replacement of a plurality of sprocket teeth without replacing the end sprocket and as a unit.

Another object of my invention is to accomplish a more efficient punching action on the dirt or other extraneous substances which collect between the rails of the track links in the operation of the tractor.

Other objects of my invention and the invention itself will be more apparent from reference to the accompanying drawings, illustrating an embodiment of my invention, and to the following specification, in which the embodiment illustrated in the said drawings is described.

Referring to the drawings:

Fig. 1 shows a portion of the track and a sprocket wheel engaging the said track portion, and which illustrates an embodiment of my invention;

Fig. 2 is a transverse section of the embodiment of Fig. 1 taken on the line 2—2 of Fig. 1;

Fig. 3 is a longitudinal medial vertical section of a fragment of the wheel of Fig. 2, the track link of Fig. 2 being omitted in Fig. 3; and Fig. 4 is an outer plan view of a portion of the track link and sprocket engaging therewith, as illustrated in Fig. 1.

Fig. 5 is an edge view of the sprocket of Fig. 1.

Referring now to all of the figures of the drawing, in all of which like parts are designated by like reference characters, at 1, I show a sprocket wheel hub, from which radiate pairs of spoke elements 2, each pair of spoke elements being in transverse alignment. The elements of each pair are joined by a connecting web 28, which connecting web is apertured at 29, in order to make the wheel lighter than it would otherwise be. The hub 1 is carried on a bearing element 4, through which motion is transmitted from a driving shaft 5 to the hub, to transmit the motive power of the engine carried by the tractor to the driving sprocket wheel. Bolts 6 are employed to rigidly connect the hub 1 to the element 4. Parallel rim rails 3 are provided for the wheel and carried at the ends of the spokes 2.

It will be noted that the wheel of my invention is generally open radially between the rim rails 3, and that dirt and extraneous substances may pass through the wheel freely between the rim rails.

The crawling track comprises track shoes or links 7, which are linked together at their adjacent ends by link bolts 8, each having a head 9 and having a nut 10 secured on its end remote from the head. Tubular wear elements 11 are preferably provided, being carried on the bolts 8, which extend through aligned openings 12 and 13 in overlapping lugs 14 and 15 of each rail on pairs of track links joined by the bolt 8.

The special manner, herein illustrated, of connecting adjacent pairs of track links is not of the essence of the present invention, and my invention may be practiced with various forms of connection between the links, one form of connection means being described only for the purpose of explaining my invention.

I preferably make the wear tube 11 of hardened steel, and by loosely fitting it on the bolt 8 preferably permit its rotation thereon, whereby the area of wearing surface on the tube will be considerably increased. Each track link has two pairs of lugs extending from its rails, one pair being located at each end of the link, one pair of the lugs 15 being spaced wider apart than are the other pair of lugs 14, so that the lug extensions 14 of one track link fit within the lug extensions 15 of the adjacent track link. Carried on the wheel rim 3, I have provided a pair of sprocket elements comprising the elements 16 and 17, each of these being preferably in the form of an annulus formed alike, with a machined right-angled groove 18 cut on one side thereon, as illustrated best in Fig. 2. The groove 18 comprises a radial surface 19 and a surface 20. Complementary surfaces are provided on the exterior peripheral portions of the wheel at the lateral sides thereof near its periphery and at its peripheral outer surface adjacent the lateral sides, whereby the rings 16 and 17, disposed oppositely to each other, may be firmly seated on the peripheral edge portions of the wheel at its rim and rigidly secured thereto by means of bolts 21, which pass through aligned apertures of the wheel rim rail portions 3 and the sprocket elements 16 and 17. Sprocket teeth 22, preferably integrally formed with the sprocket elements 16 and 17 and projecting radially therefrom, are formed of hardened steel, such as manganese steel, each element 16 being so placed on the wheel rim that each sprocket tooth 22 is disposed in transverse alignment with a like tooth of the other element.

I preferably dispose the bolt openings for the bolts 21, each alike with reference to the teeth, so that it is only necessary to indifferently align the openings of one of the elements 16 or 17 with the bolt openings provided in the wheel rim rails 3 to ensure that the teeth of such a sprocket element will be disposed in transverse alignment with the teeth of the other sprocket element.

I preferably also, as illustrated, provide these sprocket wheel teeth in pairs, and so space them that they fit snugly between the rails 23 and 24 of the track links.

Each track link, it may be said, is provided, in accordance with established practice, with an outer or shoe portion 25 which may be provided with ground engaging grouters 26, or the like, and rails 25 and 26 are disposed longitudinally of the link and spaced from, though disposed parallel to each other, each being supported on the shoes by columns 27 and apertured at the so-called lugs 14 and 15 extending therefrom at the ends of the link.

In the construction illustrated and described, I preferably make the hub and spokes of grey cast steel, and the annular sprocket elements 16 and 17 of hard steel, preferably manganese steel. The tracks 23 and 24 are preferably made also of hardened and preferably manganese steel, the entire link being preferably an integral manganese steel casting. The sprocket, comprising parallel, relatively narrow rim rails and annular teeth carrying rings 16 and 17, are spaced each from the other by the webs 28, which are relatively narrow so that dirt and other extraneous substances, such as stones of considerable size, may pass through the openings between the rails 23 and 24 of the track links and the radially aligned openings between the sprocket teeth carrying rings 22 of the sprocket wheel and the rim portions 3 carrying such rings, and pass through the wheel laterally between the spokes 2.

It is to be noted also that the sprocket teeth by this construction, wherein they are made of strong hardened manganese steel, may be made smaller than otherwise and that disposed as they are closely adjacent the inner faces of the shoe rails, a better dirt ejecting, punching action is had. In the embodiment of my invention illustrated, I so make the external width of the sprocket substantially the same as the spacing between the rails of the track links, so as to better accomplish this result, and the complementary ends of the track links are provided with vertical openings through which the sprocket teeth will project and eject and punch the dirt collected therein.

Having thus described a specific embodiment of my invention, I am aware that numerous extensions and departures may be made from the embodiment herein illustrated and described, but which are comprehended within the spirit of my invention.

What I claim is:—

1. In a sprocket wheel, the combination with a wheel hub, a pair of parallel wheel rim rails, thin transverse web supporting means to carry the rails upon the hub, a pair of laterally spaced parallel sprocket elements each having spaced radially projecting sprocket teeth integrally secured together, each sprocket element adapted to be rigidly secured to one of the rim rails, the teeth of each element being disposed in transverse alignment with reference to the teeth of the other element, the peripheral surface of the wheel between the sprockets being substantially entirely radially opened from the radial exterior of the wheel to the spaces between the webs, and the wheel being substantially entirely laterally opened between the webs, whereby relatively large extraneous objects, such as stones, clods of earth, and the like, entering the track may be ejected by passing radially through the spaced sprocket elements.

2. In an end roller wheel for a continuous track of a track laying tractor, the combination with the hub of the wheel, a pair of spaced parallel wheel rims, a plurality of thin transverse webs, integrally joining the rims to the hub, the peripheral surface of the wheel between the sprockets being substantially entirely radially opened from the radial exterior of the wheel to the spaces between the webs, and the wheel being substantially entirely laterally opened between the webs, whereby relatively large extraneous objects, such as stones, clods of earth, and the like, entering the track may be ejected by passing radially through the spaced sprocket elements.

In testimony whereof I hereunto affix my signature this 7th day of December, 1925.

ROLLIN H. WHITE.